United States Patent [19]

Sato

[11] 4,171,197
[45] * Oct. 16, 1979

[54] APPARATUS FOR CONTINUOUSLY ROLLING UP SHEETS OF BAKED COOKIES

[75] Inventor: Fumio Sato, Zami, Japan

[73] Assignee: Morinaga and Company, Ltd., Japan

[*] Notice: The portion of the term of this patent subsequent to Aug. 23, 1994, has been disclaimed.

[21] Appl. No.: 861,298

[22] Filed: Dec. 16, 1977

[30] Foreign Application Priority Data

Dec. 30, 1976 [JP] Japan ................. 51/160098

[51] Int. Cl.² .................................. A21C 3/06
[52] U.S. Cl. ............................. 425/321; 99/353; 99/450.2; 425/33.5
[58] Field of Search ........... 425/321, 320, 335, 363, 425/371, 374, 322; 99/450.2, 353

[56] References Cited

U.S. PATENT DOCUMENTS

| 3,704,664 | 12/1972 | Fisher, Jr. ................ | 425/321 X |
| 4,043,259 | 8/1977 | Sato ....................... | 99/353 |

FOREIGN PATENT DOCUMENTS 1367457 6/1964 France ................... 425/321
565195 6/1957 Italy ..................... 425/321

Primary Examiner—William R. Briggs
Attorney, Agent, or Firm—McGlew and Tuttle

[57] ABSTRACT

A device for forming rolled sheet articles such as cookies comprises a first endless conveyor including an oblique article support surface portion and an adjacent substantially horizontal article support surface portion. A rolling up roller is disposed over the first endless conveyor in the vicinity of the junction between the oblique portion and the horizontal portion, and it is rotated at a speed which is slower than the speed of the first conveyor in position so as to engage the article and deflect it into engagement with its own surface and form it into a partial rolled up form. A stop member is positioned alongside the rolling up roller, and it deflects the leading edge of the partially rolled up article so that it moves away on the horizontal portion of the first conveyor. A rolling up belt conveyor is also arranged to extend substantially parallel to the horizontal portion, and it is spaced away by an amount to engage the partially formed rolled up article. The rolling up belt conveyor is moved at a speed and in a direction such that it causes the article to continue its rolling movement to form it into a finally formed article.

5 Claims, 2 Drawing Figures

APPARATUS FOR CONTINUOUSLY ROLLING UP SHEETS OF BAKED COOKIES

BACKGROUND OF THE INVENTION

1. Field of the Invention

This invention relates in general to the construction of devices for forming articles into a roll and in particular to a new and useful device for rolling up cookies which have been baked in an oven.

2. Reference to a U.S. Application

This invention is an improvement over the apparatus for forming sheets of cookies which have been disclosed and claimed in U.S. Pat. No. 4,043,259, issued on Aug. 23, 1977.

DESCRIPTION OF THE PRIOR ART

The present invention is an improvement over the prior art inasmuch as it provides means for the controlled initial formation of an article such as a cookie into a rolled form, and for its subsequent complete rolling using a conveyor element which feeds the article over the surface of a roll up roller and then deflects the article away so that it may be carried between two conveyors which operate on the article to form an intercompleted roll.

SUMMARY OF THE INVENTION

In accordance with the invention, the article to be rolled may be either fed obliquely downwardly into contact with the surface of a roll up roller which is rotated at a slower speed than the movement of the article so that the article adheres to the surface of the roll up roller and is initially rolled thereon. Or the article may be fed obliquely upwardly over the same type of roll up roller. A feature of the invention is that a stop is provided to deflect the article which is fed over the roll up roller so that it feeds along a horizontal section of a conveyor. When in the horizontal portion of its travel the article is guided by a roll up belt conveyor which acts on its surface to cause a completion of the rolling thereof. For this purpose the roll up belt conveyor may operate at a slower speed than the conveyor which is supporting and conveying the article so as to impart the rolling action to the article, or it may be driven in an opposite direction.

Accordingly it is object of the invention to provide an improved device for rolling up articles such as cookies, which comprises feeding it obliquely over the surface of a roll up roller, then deflecting the partially formed article away from the roll up roller between two horizontally extending oppositely acting conveyors which operate on the article to complete it into a final roll.

A further object of the invention is to provide a device for forming articles such as cookies into rolls which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawing and descriptive matter in which preferred embodiments of the invention are illustrated.

GENERAL DESCRIPTION OF THE PREFERRED EMBODIMENTS

Figure 1:
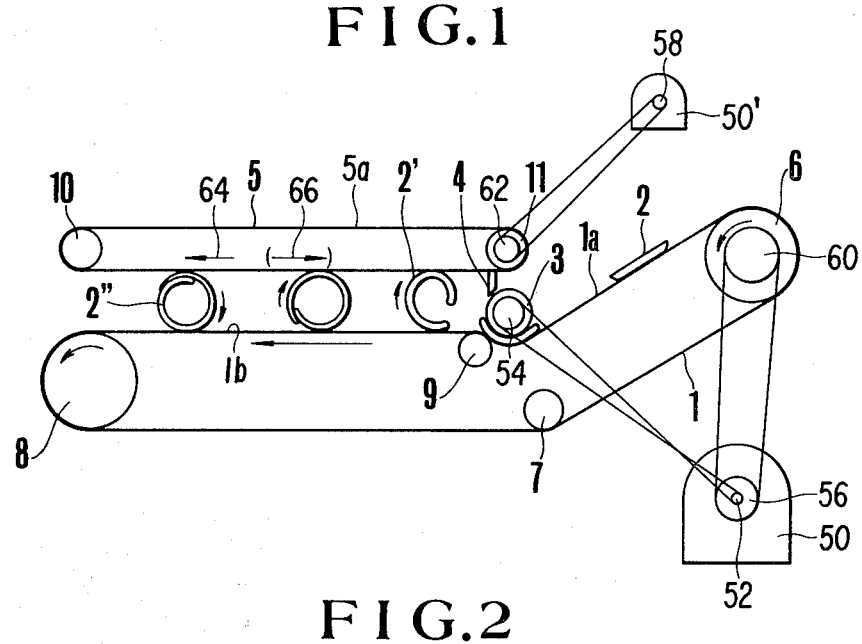
FIG. 1 is a schematic side elevational view of an apparatus for forming cookies into rolls constructed in accordance with the invention.

Referring to the drawings in particular, the invention embodied therein in FIG. 1 comprises a first belt conveyor generally designated 1 which includes an oblique portion 1a for the downward feeding of articles or sheets of cookies 2 into association with a roll up roller generally designated 3 which is operated at a much slower speed than the speed of advance of the belt conveyor, which is guided over drive pulley 6, and guide pulleys 7, 8 and 9. The rolling up roller is located at the juncture of the oblique portion 1a with a horizontal portion 1b that is positioned so as to extend in the path of the articles 2 to cause the articles to become deflected over the surface of the rolling up roller 3 and form it into a partially rolled configuration.

In accordance with a feature of the invention, a stopper member of stop 4 is located alongside the rolling up roller 3 in a position such that it deflects the partially rolled sheet away from the rolling up roller and permits it to move along the horizontal portion 1b of the conveyor 1 to a position in which a partially rolled sheet 2' is engaged between the horizontal portion 1b and a rolling up conveyor 5 which includes an endless belt 5a trained around a drive pulley 11 and a guide pulley 10. The endless belt 5a is driven at a speed and in a direction such that it will cause the partially rolled article 2' to continue to be rolled into a finally rolled article or cookie 2''.

For the purposes of illustration only the drive means includes a drive motor 50 having a shaft containing a drive pulleys 52 and 56 for driving a pulley 54 of the shaft of the rolling up roller 3 and a pulley 60 of shaft holding the pulley 6, respectively; another motor 50 with pulley 58 for driving a drive pulley 62 of pulley 11. The drive means is such that the roll up roller is rotated at a speed slower than but in the same direction as the endless belt of the belt conveyor 1 and the belt conveyor 5a is either driven in the direction of the arrow 64 but at a much slower speed than the horizontal portion 1b, or it is driven in the direction of the arrow 66 in a reverse direction so as to effect the completed rolling of the articles to the final roll form 2''.

Figure 2:
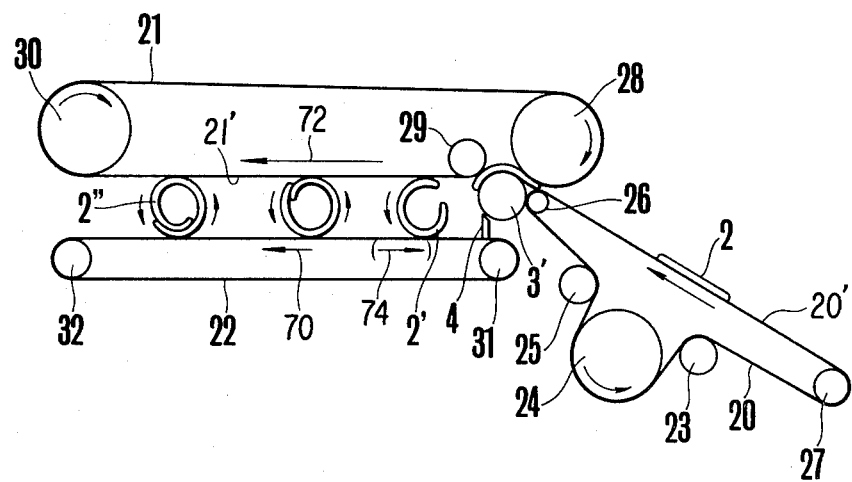
FIG. 2 is a view similar to FIG. 1 of another embodiment of the invention, but without the schematic drive being shown.

In the embodiment shown in FIG. 2, the articles 2 are fed over an upwardly extending oblique conveyor portion 20' of an endless belt conveyor 20 which is guided by rollers 23, 24, 25, 26 and 27. In this embodiment the article is fed over the top surface of a roll up roller 3' which is disposed between the oblique portion 20' and a horizontal portion 21' which is part of a separate conveyor 21 trained to run over conveyor rollers 28 and 30 and guide roller 29. In this embodiment a rolling up belt conveyor 22 supports the partially rolled article 2' and the finally rolled article 2'' and also contributes to its being rolled up by either driving it in the direction of the arrow 70 at a slower speed than the direction of advance of the horizontal portion 21' indicated by the arrow 72, or driving it in an opposite direction as indicated by the arrow 74. The rolling up belt conveyor 22 includes an endless belt guided over rollers 31 and 32.

The invention provides means for rolling particularly cookies but may also be employed for rolling other articles which have characteristics such that they may be deflected around a roll up roller.

While specific embodiments of the invention have been shown and described in detail to illustrate the application of the principles of the invention, it will be understood that the invention may be embodied otherwise without departing from such principles.

I claim:

1. An apparatus for forming rolled sheet articles such as cookies, comprising first endless conveyor means including an oblique article support surface portion and an adjacent substantially horizontal article support surface portion, a rolling up roller rotatably mounted for rotation at a slower speed than the speed of said first endless conveyor means located adjacent the juncture of said oblique article support surface portion and said horizontal article support surface portion, in a position to deflect an article thereon into a path around its periphery to begin forming it into a roll, a stop disposed alongside said rolling up roller to stop the movement of the article around said roller and to permit it to move along said horizontal article support surface portion, and a rolling up belt conveyor having a portion substantially parallel to said horizontal article support surface portion and spaced therefrom by an amount to engage the partially rolled article, and being moveable at a speed and in a direction to cause the continued forming of the article into a roll, and drive means connected to said first endless conveyor means, said rolling up roller, and said rolling up belt conveyor to drive them.

2. An apparatus according to claim 1, wherein said oblique portion extends obliquely upwardly to said roll up roller.

3. An apparatus according to claim 1, wherein said oblique portion extends obliquely downwardly to said roll up roller.

4. An apparatus according to claim 1, wherein said horizontal portion is disposed beneath the article.

5. An apparatus according to claim 1, wherein said horizontal portion is disposed above the article and supports the article on said rolling up belt conveyor, said rolling up belt conveyor being located below the article.

* * * * *